Patented Jan. 4, 1938

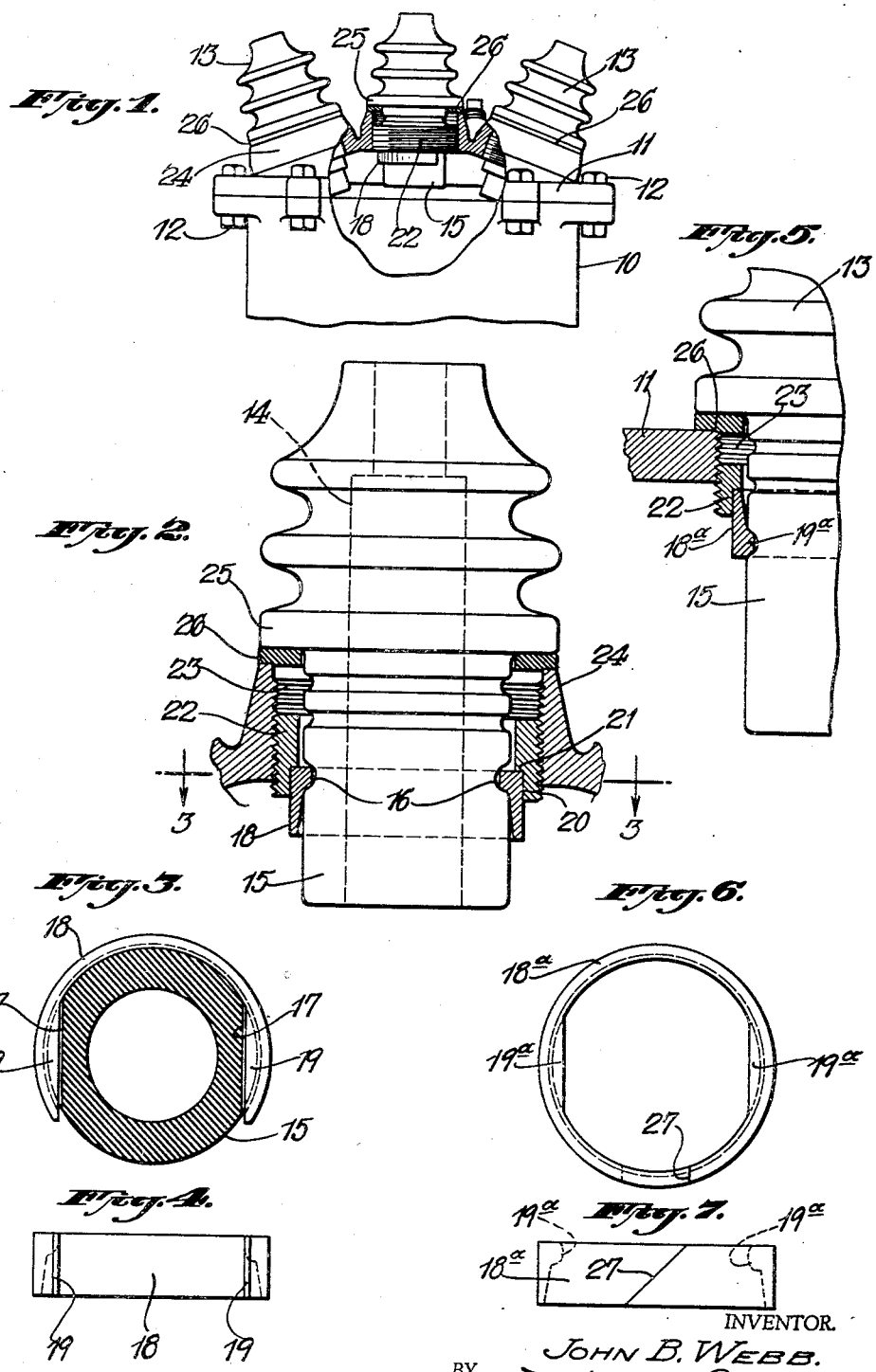

2,104,108

UNITED STATES PATENT OFFICE 2,104,108

POTHEAD FITTING

John B. Webb, Dobbs Ferry, N. Y., assignor to Anaconda Wire & Cable Company, New York, N. Y., a corporation of Delaware Application July 14, 1936, Serial No. 90,475

4 Claims. (Cl. 247—6)

The present invention relates to potheads, such as used in electrical installations and more particularly to features of improvement in the fastening means for securing insulators or frangible material to the metallic caps or casings of the pothead. The particular fastening means forming the subject matter of the present invention is so arranged that the insulator can be attached or detached from the casing without the necessity of having access to the interior thereof. For further particulars concerning the present improvement, reference is to be made to the accompanying drawing, following specification and the appended claims.

In the drawing—

Fig. 1 is an elevation of a portion of a pothead partly broken away and shown in section; Fig. 2 is an enlarged section showing sufficient structure of the pothead to illustrate the present improvement; Fig. 3 is a detail horizontal section of portions shown in Fig. 2, taken on line 3—3 thereof; Fig. 4 is a front elevation of an expansible member shown in Fig. 3; Fig. 5 is a fragmentary detail illustrating an alternative embodiment of the invention; Fig. 6 is a plan view of the expansible member of Fig. 5; Fig. 7 is a front elevation thereof.

Referring in detail to the drawing, 10 represents a pothead which is in the nature of a casing or receptacle adapted to hold liquid insulating material. A cap portion 11 of the casing is secured to portion 10 by suitable bolts 12. One or more insulators 13 are adapted to be secured by the improved fastening means of the present invention. These insulators are provided with central openings 14, through which the cables to be connected within the pothead are adapted to extend.

The insulator may be of conventional form, except that it is provided with a specially shaped shank 15 having grooves or notches 16 therein, the faces of which are flat, or non-circular, as indicated at 17 in Fig. 3.

An expansible ring-like member 18 is provided with inwardly extending lugs 19 flattened to coact with the notches 16. As shown in Fig. 3, therefore, the expansible member is in the form of a ring-like resilient member with projections coacting with the notched portions of the shank. As thus arranged, it is apparent that, when a turning movement is imparted to the insulator body, that the expansible member will also be turned.

The expansible member is fitted to an annular seat 20 having a shoulder portion 21 formed in an exteriorly screw threaded sleeve 22, the threads of which engage the internal threads 23 formed in the boss 24 of the casing.

The external diameter of the shank 15 is of such relatively small size that it can turn freely within the central opening in the sleeve 22. The base portion 25 of the insulator, however, is of relatively larger diameter than the shank and also of greater diameter than the threaded opening in the casing. A gasket 26 is interposed between the boss 24 and the body portion 25 and, when the parts are screwed down to the assembled position shown in Fig. 2, the gasket is adapted to be compressed to such an extent that a relatively fluid-tight joint is made between the insulator and the boss of the casing.

The arrangement is such that by merely turning the insulator the base thereof can be forcibly pressed against the gasket and this result is secured without the utilization of screw threads upon the insulator; the use of such threads on an insulator of frangible material being impractical because, when a frangible material is screwed into the threaded socket, the threads are apt to be fractured, or the insulator itself is subject to breakage.

With the fastening means of the embodiment of my invention shown in Figs. 1 to 4 inclusive, the gasket 26 and the threaded sleeve 22 is first slipped over the shank 15. Then the lugs on the expansible member are engaged with the non-circular or grooved portions of the shank. Thereupon, the expansible member is engaged with the shoulder seat 20 of the threaded sleeve 22. This sub-assembly is then engaged with the threaded opening of the boss and the casing. A turning movement of the insulator will cause the sleeve to screw into the threaded opening. During this turning movement, the non-circular or flattened sides of the insulator shank exert a camming action on the member 18 and, therefore, expand it against the wall of the shouldered seat in the sleeve. Thus, the torque applied to the insulator is transmitted through the expansible member to the sleeve, hence causing it to move longitudinally by virtue of the threaded engagement of the parts. And the shoulder on the sleeve acting through the ring and the notched portion of the shank will forcibly compress the gasket 26 against the boss 24.

All of this assembling can be done without the necessity of having access to the interior pothead casing, therefore, the same need not be dismantled, in order to make connections or to replace a broken insulator.

In the alternative embodiment of the invention shown in Figs. 5 to 7 inclusive, the parts operate in substantially the same manner as above described. In the modification, however, the expansible member instead of being of approximately U-shaped form, has its ends carried around to complete the ring-like structure, as shown in Figs. 6 and 7. The ring, however, is split along the diagonal line 27, so as to permit the same to be sprung apart sufficiently to enable it to be slipped over the shank 15 of the insulator. In this modification, the expansible member is indicated as a whole at 18$^a$ and the lugs thereon at 19$^a$. The other parts, which are similar to those shown in Fig. 2, are identified by corresponding reference characters.

Having thus described the invention, features which are thought to be novel and to embrace the present improvements are set forth in the appended claims.

What I claim is:—

1. The combination with a pothead casing having a screw threaded opening and an insulator, of securing means adapted to be operated from the exterior of the casing by manipulation of the insulator for clamping the latter to the casing, said securing means comprising a screw threaded sleeve engaging the threads of said opening, said insulator having a shank of a diameter to permit it to turn freely in said opening, a non-circular notched portion on said shank, an expansible resilient member having lugs entering said notched portion and said sleeve having a shouldered annular seat within which said member is seated, whereby the turning of the insulator expands said member within the sleeve thereby rotating the latter and screwing it along said threaded opening, thus clamping the insulator against the casing or retracting it depending upon the direction of rotation.

2. The combination with a casing having a screw threaded opening and an insulator, of securing means within the casing and operable from the exterior thereof for clamping the insulator to the casing, comprising a screw threaded sleeve engaging the threads of said opening through which the insulator projects, said insulator having cam portions formed on a shank of a diameter to permit it to turn freely within the sleeve, and having a base portion of larger diameter than the opening in the casing, said sleeve having an annular shouldered seat therein, an expansible member coacting with said seat and having lugs co-acting with said cam portions whereby the turning of the insulator expands said member within the sleeve thereby rotating the latter and screwing it along said threaded opening thus forcing said base portion against the casing or retracting it depending upon the direction of rotation of the insulator.

3. The combination with a metal pothead casing having a screw threaded opening and an insulator of frangible material such as porcelain, of securing means adapted to be operated from the exterior of the casing by manipulation of the insulator for clamping the latter to the casing, said securing means comprising a screw threaded sleeve engaging the threads of said opening, said insulator having a shank of a diameter to permit it to turn freely in said opening, said shank having a flattened notched portion, a resilient ring-like member having an inwardly extending lug for coaction with said flattened portion of said shank and said sleeve having a shouldered annular seat in which said member is sealed.

4. The combination with a metal pothead casing having a screw threaded opening and an insulator of frangible material such as porcelain, of securing means adapted to be operated from the exterior of the casing by manipulation of the insulator for clamping the latter to the casing, said securing means comprising a screw threaded sleeve engaging the threads of said opening, said insulator having a shank of a diameter to permit it to turn freely in said opening, said shank having a flattened portion, a resilient ring-like member having an inwardly extending lug for coaction with said flattened portion of said shank and said sleeve having a shouldered annular seat in which said member is seated and a gasket between the casing and the insulator adapted to be compressed therebetween upon the rotation of the insulator.

JOHN B. WEBB.